Nov. 11, 1952 — R. G. SMITH — 2,617,554

HIGH-PRESSURE SEALED STRUCTURE

Filed Aug. 27, 1949 — 4 Sheets-Sheet 1

INVENTOR.
RUSSELL G. SMITH
BY Zugelter & Zugelter
Attys.

Nov. 11, 1952  R. G. SMITH  2,617,554
HIGH-PRESSURE SEALED STRUCTURE
Filed Aug. 27, 1949  4 Sheets-Sheet 2

INVENTOR.
RUSSELL G. SMITH
BY
Zugelter & Zugelter
Attys

Nov. 11, 1952  R. G. SMITH  2,617,554
HIGH-PRESSURE SEALED STRUCTURE
Filed Aug. 27, 1949  4 Sheets-Sheet 3
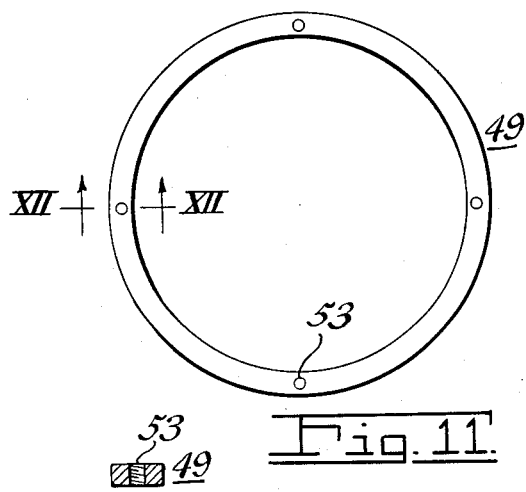
Fig. 11.
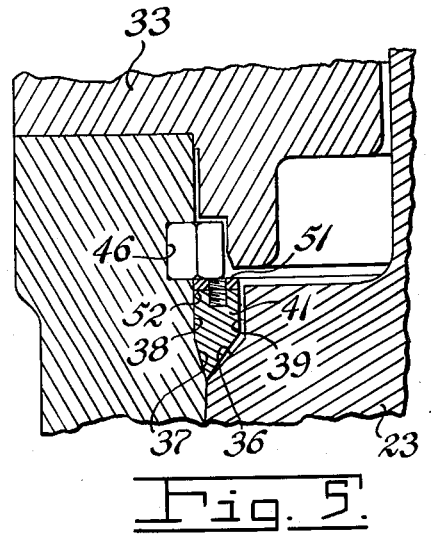
Fig. 5.
Fig. 12.
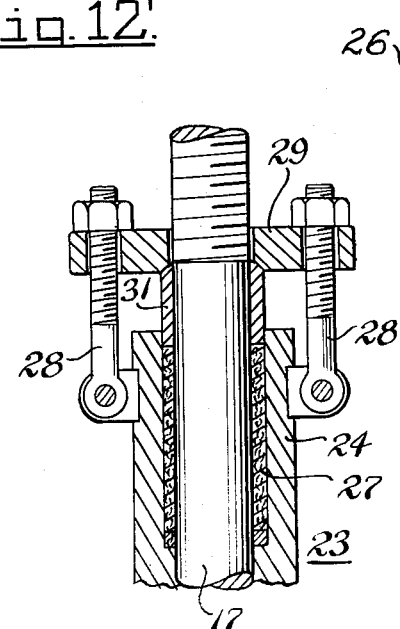
Fig. 6.
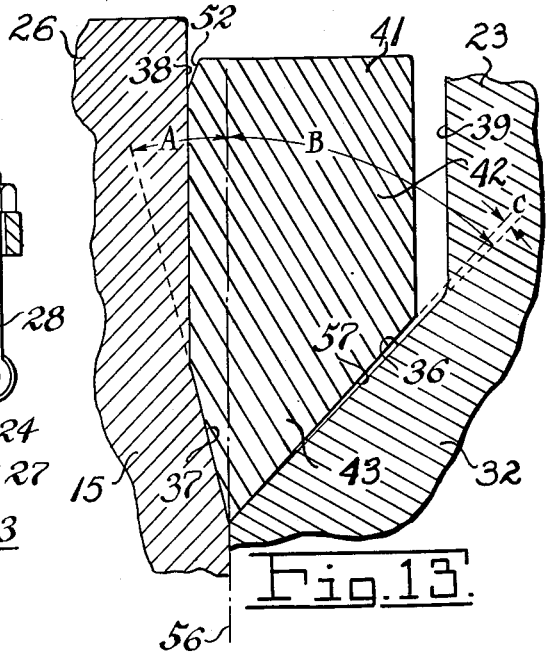
Fig. 13.
INVENTOR.
RUSSELL G. SMITH
BY Zugelter & Zugelter
Attys.

Patented Nov. 11, 1952

2,617,554

UNITED STATES PATENT OFFICE 2,617,554

HIGH-PRESSURE SEALED STRUCTURE

Russell G. Smith, Cincinnati, Ohio, assignor to The William Powell Company, Cincinnati, Ohio, a corporation of Ohio Application August 27, 1949, Serial No. 112,683

2 Claims. (Cl. 220—46)

This invention relates to high pressure seals and more particularly relates to an annular sealing structure between a valve body and valve bonnet of a valve for high pressure steam lines and the like or between other members where an annular seal is desired.

An object of this invention is to provide an annular seal which can withstand high pressures yet can readily be disassembled and reassembled.

Another object of this invention is to provide a seal in which an annular gasket or packing ring having an edge of approximately V-shape in cross-section is held in an approximately V-shaped groove formed between tapered surfaces on a valve body and valve bonnet.

A further object of this invention is to provide a valve body and bonnet each having an annular tapered surface, the tapered surfaces cooperating to form a seat for an annular gasket having an annular edge of approximately V-shape in section.

A further object of this invention is to provide seats for an annular gasket between a valve body and bonnet which seats face outwardly and are readily accessible for lapping and resurfacing.

A still further object of this invention is to provide seats for an annular gasket that forms an annular seal which gasket can readily be freed from the seats without scraping on or marring seating surfaces.

Briefly this invention provides an annular seal between a valve bonnet and valve body in which tapered or frusto-conical seats on the valve bonnet and body receive an annular gasket or packing ring which has a portion which is generally of V-shape in cross-section. A thrust ring inserted in the valve body takes the thrust imposed by the gasket. Pressure inside the valve body holds the valve bonnet seat against the gasket and forces the gasket against the tapered seats of the valve body and bonnet to form an effective seal, yet when the thrust ring is removed the gasket can be slipped free from the seats without scraping the seats. The bonnet and valve body can readily be separated after removal of the thrust ring and gasket. When the gasket is removed, it can be drawn free of the tapered seats without damage to the gasket seats. Moreover, the seat in the valve body can readily be resurfaced when necessary since the valve body seat is tapered and faces outwardly where it can be reached with a lapping tool.

The above and other objects and features of the invention will in part be apparent and will in part be obvious from the following detailed description and the drawings, in which:

Fig. 4 is an enlarged fragmentary sectional view taken along the line III—III in Fig. 2;

Fig. 5 is an enlarged fragmentary sectional view taken along a line V—V in Fig. 2;

Fig. 6 is a longitudinal sectional view showing details of the valve bonnet and packing of the valve illustrated in Fig. 1;

Fig. 7 is a plan view showing a gasket which forms a pressure seal between the valve bonnet and valve body;

Fig. 8 is a view in section taken along a line VIII—VIII in Fig. 7;

Fig. 9 is a plan view showing a segmental thrust ring which serves to hold down the gasket;

Fig. 10 is a sectional view taken along a line X—X in Fig. 9;

Fig. 11 is a plan view showing a pressure ring which is disposed between the gasket and the clamping ring;

Fig. 12 is a view in section taken along a line XII—XII in Fig. 11;

Fig. 13 is an enlarged schematic view showing the gasket and fragments of the valve body and valve bonnet in cross-section.

In the following detailed description and the drawings, like reference characters indicate like parts.

Figure 1:
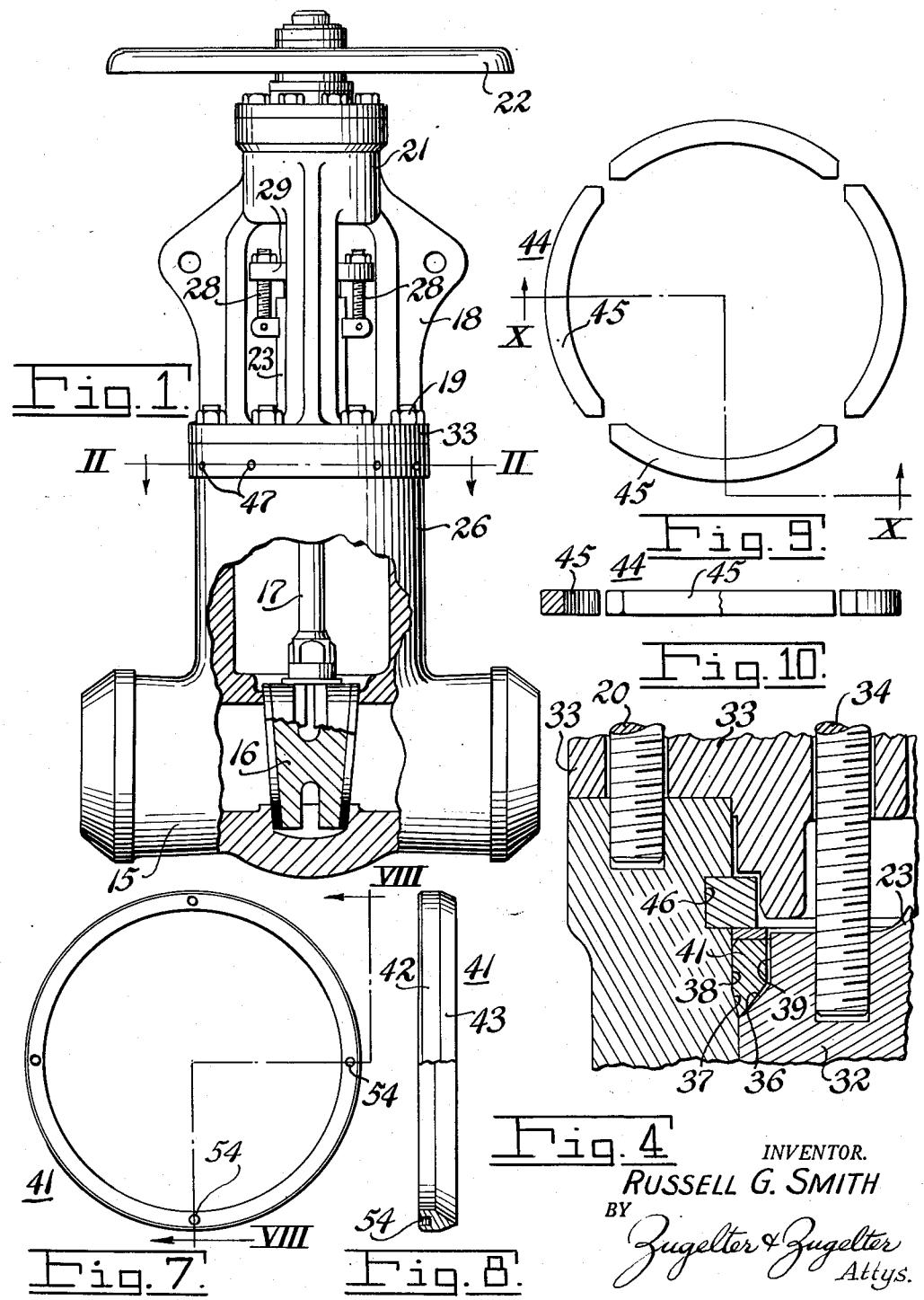
Figure 1 is a view in side elevation partly broken away and in section showing a high pressure valve which includes a pressure seal constructed in accordance with an embodiment of this invention.
Figure 2:
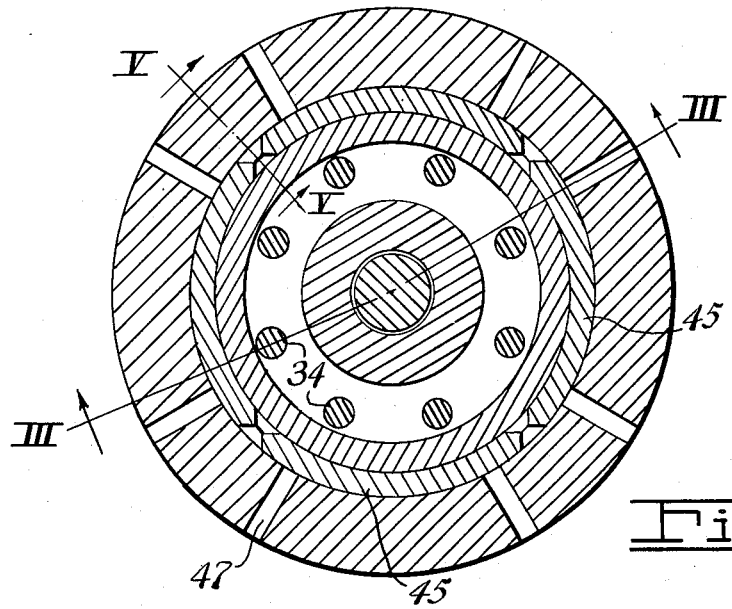
Fig. 2 is a view in section taken along a line II—II in Fig. 1.

In Fig. 1 is shown a high pressure gate valve having a body 15, a wedge or gate 16, and a valve stem 17 attached to the gate 16 and adapted to raise and lower the gate. A yoke 18 is attached to the valve body by removable nuts 19 threaded on studs 20. The yoke supports a bearing housing 21 at the upper end of the yoke 18. A wheel or handle 22 is connected to an appropriate rotatable nut (not shown) inside the bearing housing whereby the valve stem and gate may be raised or lowered when the wheel 22 is turned.

Figure 3:
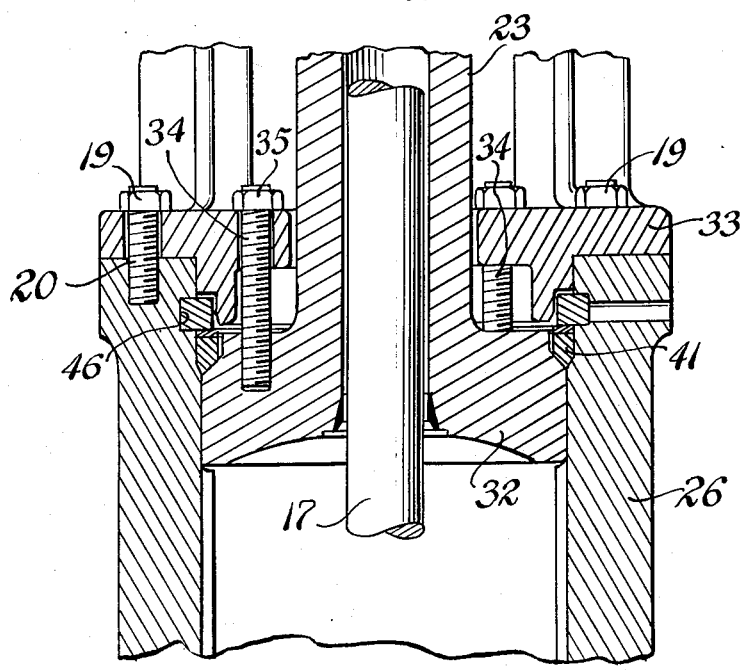
Fig. 3 is a view in section taken along a line III—III in Fig. 2.

A valve bonnet 23 (Fig. 3) surrounds the valve stem. The valve bonnet 23 is tubular in shape and has an upper end 24 which extends inside the valve yoke 18. The lower end of the valve bonnet fits inside a blunt-ended tubular neck portion 26 of the valve body which surrounds the valve stem. The upper end of the bonnet is counterbored to form a packing box 27 (Fig. 6). Pivoted eye bolts 28 attached to the upper end of the bonnet hold down a gland flange 29 against a packing gland 31 and hold the gland against packing in the packing box. The eye bolts 28 extend through holes in the gland flange and compress the packing.

The lower end of the bonnet is outwardly flanged as indicated at 32 (Fig. 3) and the flange 32 is normally disposed inside the neck portion 26 of the body. The lower end of the yoke 18 is in the form of a ring 33 by means of which the yoke is attached to the valve body 15, and an inner portion of the ring 33 extends over the flange 32 of the bonnet. Studs 34 extend through bores in the ring and nuts 35 on the studs are adapted to draw the flange of the bonnet toward the ring 33.

As shown in Figs. 4 and 5, an outwardly and downwardly tapered or frusto-conical surface 36 is formed on the outside of the valve bonnet flange. The valve housing is provided with an inwardly and downwardly tapered or inverted frusto-conical interior surface 37, and the tapered surfaces 36 and 37 are disposed opposite one another to form substantially a V-shaped annular groove between the valve body and valve bonnet. The valve body and valve bonnet each have cylindrical surfaces extending upwardly from the upper edges of the tapered surfaces, as indicated at 38 and 39 respectively, so that an annular slot is formed between the valve bonnet and valve body into which a gasket 41 fits.

The gasket 41 (Figs. 7 and 8) is formed of a yieldable material, for example a metal such as soft annealed iron having a Brinnel hardness number preferably not exceeding 80, or other yieldable metal, e. g., copper or other suitable material such as pressed asbestos or the like. As shown in Figs. 7 and 8, the gasket 41 includes a hollow cylindrical portion 42 and a portion 43 of substantially V-shaped cross-section. The gasket fits into the slot between the bonnet and valve body and forms a seal therebetween.

The gasket is held down by a segmental thrust ring 44 (Figs. 9 and 10) which is inserted in the valve body above the gasket. The thrust ring consists of a plurality of segments 45, all of which may be cut from a single ring. An annular groove 46 is formed in the inner surface of the valve housing adjacent its upper end. The segments fit into the groove 46. Radial bores 47 may be provided in the valve body through which a knock-out pin may be inserted for driving the segments out of the retaining groove 46. A pressure ring 49 (Figs. 11 and 12) formed of hard rigid metal, e. g. hardened stainless steel may be placed between the thrust ring and the gasket, and serves to distribute pressure on the thrust ring over the top surface of the gasket preventing deformation of the top surface of the relatively soft gasket. The gasket is beveled as indicated at 52 so that when the gasket is removed from the valve housing the bevel will ride over edges of the groove 46 without catching therein. The pressure ring 49 and gasket ring 41 each may contain spaced threaded holes, indicated at 53 and 54 respectively to which pull-out screws may be attached for ease in removing the rings from the valve housing.

When fluid under pressure is introduced into the valve, pressure beneath the bonnet forces the bonnet upwardly to bring the surface 36 against the lower surface of the gasket, and the material of the gasket is forced against the tapered surfaces 36 and 37 to form a seal between the bonnet 23 and valve body 15 which may withstand pressures such as are encountered in high pressure steam valves and the like. The pressure on the bonnet provides the sealing pressure, and the studs 34 serve only to apply an initial pressure or load to hold the bonnet in place when the valve is not under pressure and to pre-set the gasket at the time of assembly.

In Fig. 13, the cross-sectional shape of the gasket 41 is shown in detail. The lower or V-shaped portion of the gasket has an outer surface which abuts the tapered surface 37 on the valve body. The tapered surface 37 of the valve body and the outer tapered surface of the gasket may both be directed at the same angle with a line 56, which is parallel to the valve stem, the angle being indicated at A. The inner tapered lower side of the gasket 57 may extend at an angle which is slightly less than the angle between the line 56 and the tapered surface 36 of the valve bonnet so that when assembled there is a narrow wedge-shaped space between gasket surface 57 and the bonnet surface 36. As shown, the angle between the line 56 and the tapered surface 36 of the valve bonnet is indicated at B while the angle between the surface 57 of the gasket and the surface 36 of the valve bonnet is indicated at C. The angle B may be about 45 degrees while good results have been obtained where the angle A has been varied from about 10 degrees to about 20 degrees. The angle C preferably is quite small, an angle of approximately 1 degree having been found satisfactory.

The gasket is readily removable from the valve body and bonnet when the yoke 18 has been removed. When the gasket is being removed, it comes free from the tapered seats 36 and 37 and does not move across the seats in such a manner as to mar or scratch the seats. The bonnet may readily be removed to give access to the interior of the valve body and to sections of pipe connected thereto. In addition, the seat 37 on the valve body, being tapered inwardly, is readily accessible for lapping when necessary, as is also the seat 36 on the valve bonnet. Moreover, it is not necessary to disconnect the valve housing from its position in a line when necessary to lap the tapered seat therein, and the seat 37 may be lapped while the valve body is in place.

A very effective seal is provided because the material of the gasket is deformed and forced firmly against the seats 36 and 37 when pressure is applied to the interior of the valve.

The seal described above is particularly adapted for high pressure values. A gate valve has been described in detail hereinabove, but it is to be understood that other types of valves, for example check valves, globe valves, and angle pattern valves may be formed with similar seals. In addition annular seals in other types of equipment may be formed in a similar manner.

Figure 14:
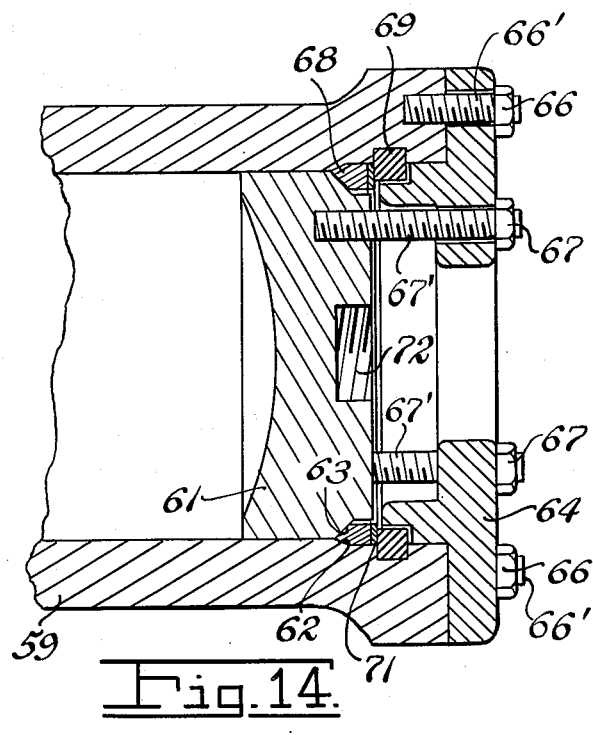
Fig. 14 is a view in longitudinal section showing a sealed joint between a tubular vessel and a cap for an end of the vessel, the seal being constructed in accordance with an embodiment of this invention.

In Fig. 14 is shown a seal between a tubular vessel 59 and an end closing cap or disc 61. The cap 61 fits inside and is embraced by a blunt end of the vessel. The inner surface of the blunt end is tapered outwardly as indicated at 62 and the outer surface of the cap is tapered at 63 opposite the taper 62, the tapered surfaces forming an outwardly facing V-shaped groove between the cap and the vessel. A ring 64 is removably attached to the blunt end of the vessel by nuts 66 on studs 66' and the cap can be drawn toward the ring 66 by nuts 67 on studs 67'. A gasket 68, which may be similar in construction to the gasket 41, is held in the groove between the tapered surfaces.

A segmental thrust ring 69 absorbs the thrust of the gasket. The ring 69 may be similar in construction to the ring 44 and is held in a groove in the blunt end of the vessel. A pressure ring 71 between the gasket and the thrust ring distributes pressure over the gasket.

The seal between the pressure vessel and cap illustrated in Fig. 14 functions in the same manner as the seal between the valve body and bonnet shown in the other drawings. Pressure inside the vessel moves the cap against the gasket and forces the gasket against the seats forming a seal between the vessel and the cap. However, the cap can readily be removed to provide access to the interior of the vessel. A threaded well 72 may be provided in the cap by means of which the cap can be held in place during assembly and disassembly of the seal.

The embodiments of the invention described above and disclosed in the drawings are subject to structural modification without departing from the spirit and scope of the appended claims.

Having described my invention, what I claim as novel and desire to secure by Letters Patent is:

1. A high pressure valve which comprises a hollow valve housing having an upstanding tubular neck, said neck having a cylindrical inner face adjacent the open end thereof and an inwardly and downwardly sloping face therebelow, a bonnet inside said neck, said bonnet having an outwardly and downwardly sloping outer face opposite the sloping face of the tubular neck, the sloping faces forming an annular groove of V-shape in section, an annular gasket of yieldable metal having a lower edge of V-shape in section disposed in said V-shaped groove, said gasket having a cylindrical outer face above the V-shaped edge of substantially the same diameter as the cylindrical face of the neck, the cylindrical face of the gasket engaging the cylindrical face of the neck, means attached to the neck above the gasket for holding the gasket in place with the lower edge thereof engaging the sloping face of the neck, and means for drawing said bonnet up the neck axially thereof to bring the sloping face of the bonnet against the gasket and cause the gasket to seat firmly on the sloping faces.

2. A high pressure valve which comprises a hollow valve housing having an upstanding tubular neck, said neck having a cylindrical inner face adjacent the open end and an inwardly and downwardly sloping face therebelow, there being an annular, inwardly facing groove of rectangular cross-section in said cylindrical face spaced above the sloping face, a bonnet inside said neck, said bonnet having an outwardly and downwardly sloping face opposite the sloping face of the neck, the sloping faces forming an annular groove of V-shape in section, an annular gasket of yieldable metal having a lower edge of V-shape in section disposed in said V-shaped groove, said gasket having a cylindrical outer face above the V-shaped edge of substantially the same diameter as the cylindrical inner face of the neck, the cylindrical face of the gasket engaging the cylindrical face of the neck, said gasket having a flat upper face extending transversely of the axis of the neck, a flat pressure ring of rigid, unyielding metal mounted on and co-extensive with the upper face of the gasket, a segmental thrust ring comprising a plurality of segments, each segment having an outer portion of the same rectangular cross section as and disposed in said rectangular groove and an inner portion overlying and engaging the upper side of the pressure ring, a yoke ring removably attached to the upper end of said neck spaced from the gasket and pressure ring and surrounding and overlying the bonnet, and means for drawing the bonnet axially toward said yoke ring to cause the gasket to seat in said V-shaped groove with the thrust ring bearing on the pressure ring to absorb thrust of the gasket.

RUSSELL G. SMITH.

REFERENCES CITED

The following references are of record in the file of this patent:

UNITED STATES PATENTS

| Number | Name | Date |
|---|---|---|
| 1,673,011 | Mauser | June 12, 1928 |
| 2,215,537 | Bjong | Sept. 24, 1940 |
| 2,305,590 | Marburg et al. | Dec. 22, 1942 |
| 2,389,118 | Buehner | Nov. 20, 1945 |
| 2,424,449 | Gasche | July 22, 1947 |